United States Patent [19]

Sechi

[11] 4,372,220
[45] Feb. 8, 1983

[54] MOTOR VEHICLE FOR USE ON ROADS AND RAILWAYS

[75] Inventor: Lucio Sechi, Tricesimo, Italy

[73] Assignee: Danieli & C. Officine Meccaniche S.p.A., Buttrio, Italy

[21] Appl. No.: 172,666

[22] Filed: Jul. 28, 1980

[30] Foreign Application Priority Data

Jul. 27, 1979 [IT] Italy .................. 83428 A/79

[51] Int. Cl.³ .................. B61C 11/00; B61F 13/00
[52] U.S. Cl. .................. 105/215 C
[58] Field of Search .......... 105/215 C, 215 R, 199 R, 105/199 S

[56] References Cited

U.S. PATENT DOCUMENTS

| | | | |
|---|---|---|---|
| 2,986,102 | 5/1961 | Cox | 105/215 C |
| 3,002,469 | 10/1961 | Wanner | 105/215 C |
| 3,003,433 | 10/1961 | Hoppe | 105/215 C |
| 3,019,742 | 2/1962 | Kershaw | 105/215 C |
| 3,057,306 | 10/1962 | Hatfield | 105/215 C |
| 3,086,483 | 4/1963 | Scheldrup | 105/215 C |
| 3,638,580 | 2/1972 | Yard | 105/215 C |
| 3,704,671 | 12/1972 | Horne et al. | 105/215 C |
| 3,892,187 | 7/1975 | White | 105/215 C |
| 3,898,938 | 8/1975 | Poole | 105/215 C |

FOREIGN PATENT DOCUMENTS

| | | | |
|---|---|---|---|
| 438914 | 3/1969 | Australia | 105/215 C |
| 539257 | 6/1955 | Belgium | 105/215 C |
| 335553 | 5/1929 | Fed. Rep. of Germany | 105/215 C |
| 1128456 | 4/1962 | Fed. Rep. of Germany | 105/215 C |
| 1913878 | 10/1970 | Fed. Rep. of Germany | 105/215 C |
| 1605050 | 12/1970 | Fed. Rep. of Germany | 105/215 C |
| 2124306 | 11/1972 | Fed. Rep. of Germany | 105/215 C |
| 2554463 | 8/1977 | Fed. Rep. of Germany | 105/215 C |
| 1008700 | 3/1948 | France | 105/215 C |
| 310567 | 3/1929 | United Kingdom | 105/215 C |

*Primary Examiner*—Richard A. Bertsch
*Attorney, Agent, or Firm*—Stevens, Davis, Miller & Mosher

[57] ABSTRACT

The invention relates to a motor vehicle for use on roads and railways which can be run on roads or railways, including in combination: driving tired road wheels; railwheels temporarily positionable at least partially below the said road wheels, at least some of the rail wheels being driven in this temporary position by the road wheels; and temporary positioning means provided for the movement of the the rail wheels.

4 Claims, 6 Drawing Figures

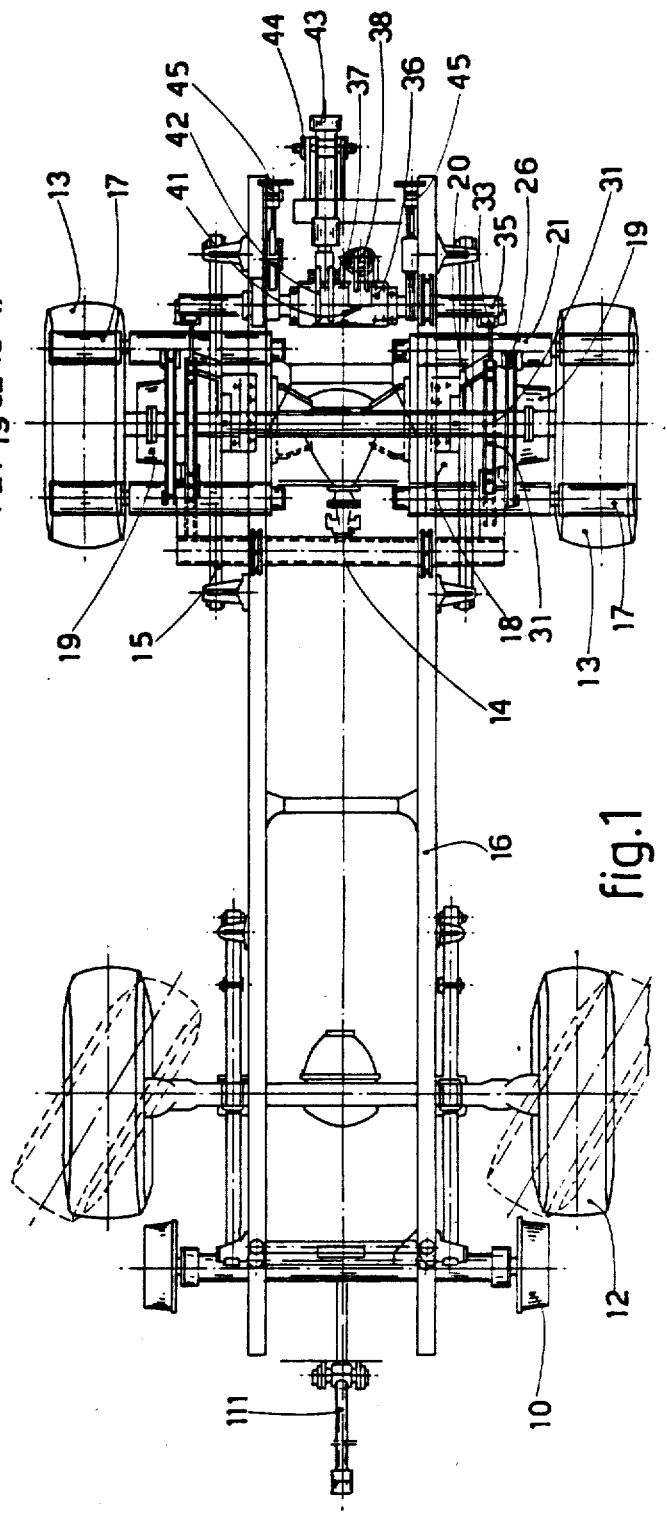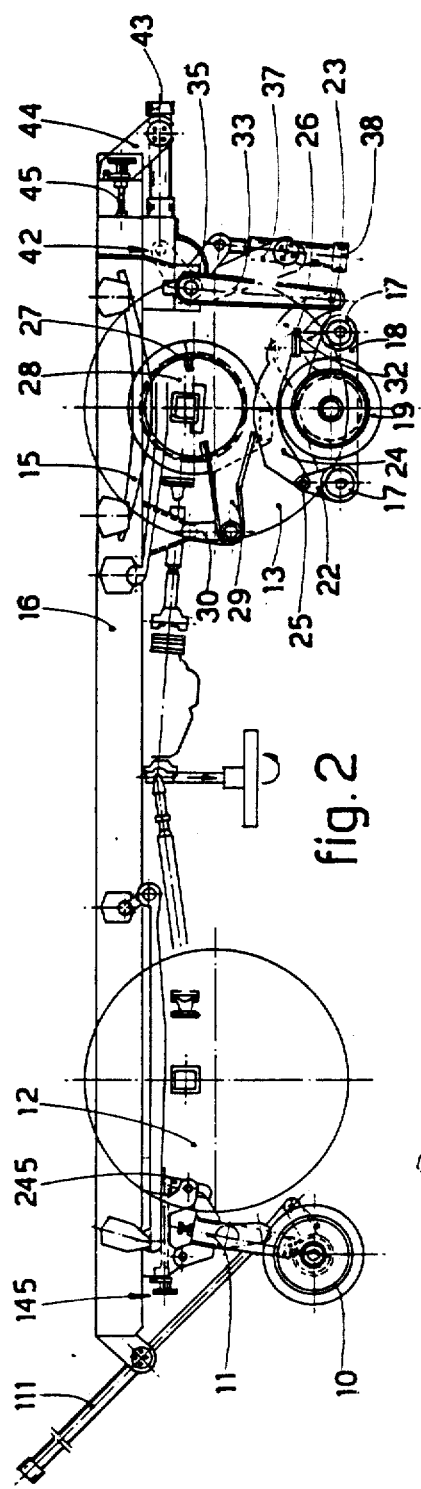

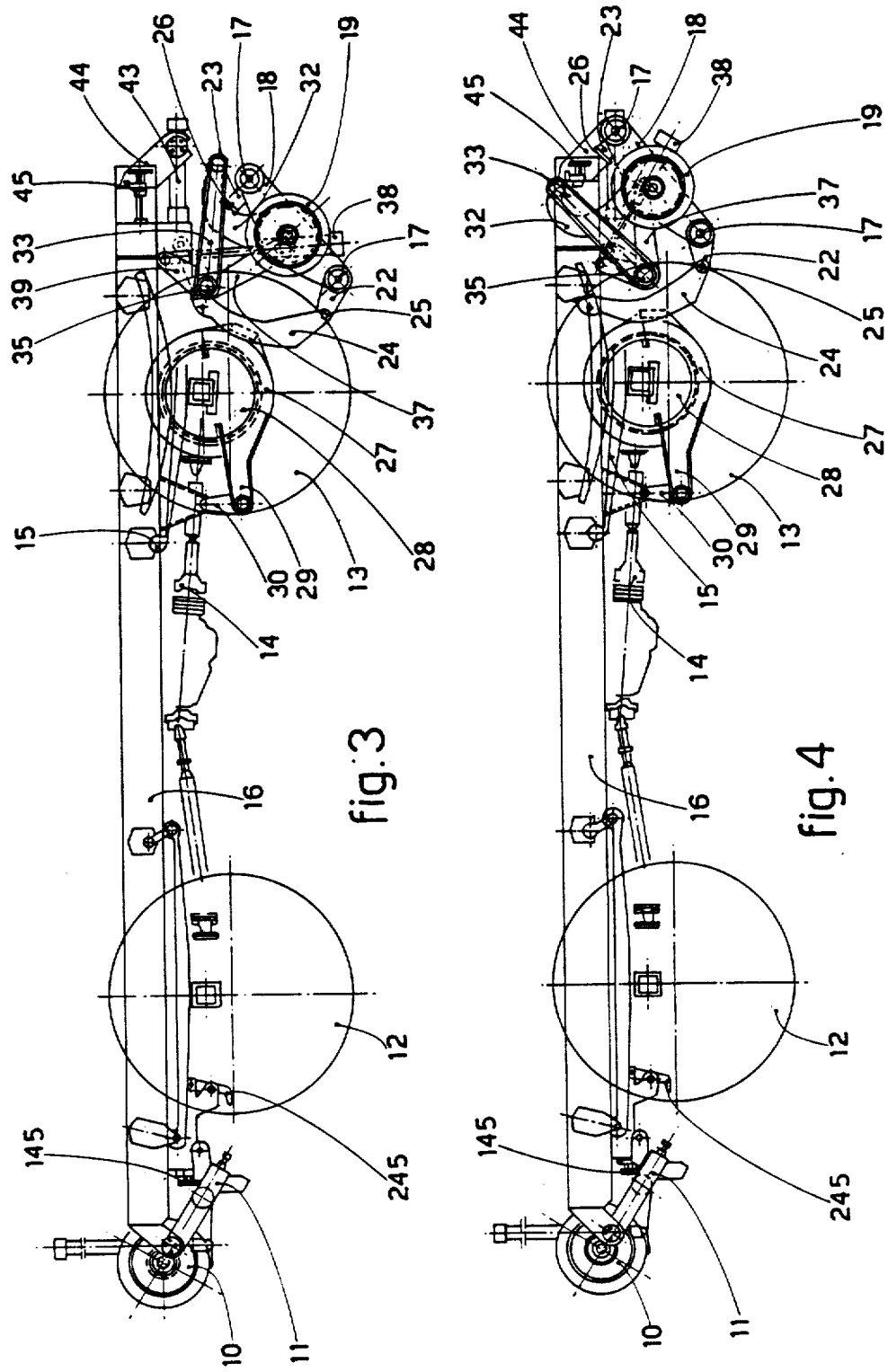

MOTOR VEHICLE FOR USE ON ROADS AND RAILWAYS

The present invention relates to a motor vehicle useable on roads as well as on railways.

More precisely the present invention relates to a motor vehicle of the traditional type suitable for use on motor roads which, with the application of some special parts, is also suitable for use on rails or railways.

Vehicles which are used on roads as well as rails are known.

Such vehicles can be essentially divided into two types; vehicles which travel on railways that can also be used on motor roads and vehicles that travel on motor roads that can also travel on railways.

The present invention is mainly but not essentially directed to the second type of motor vehicle.

The known types of motor vehicles travelling mainly on motor roads but able also to travel on rails envisages the presence of tire wheels that engage the rails, such wheels may eventually include an internal support ring for staying on the track.

This type of solution leads to the abnormal wear of the tires which as a result have a very short life.

In addition, the known systems are very complex and require a direct transmission of the driving torque to the driving wheels which engage the rails.

It is therefore an object of the present invention to provide a motor vehicle for use both on motor roads and railways and which include the characteristic features.

Another object of the present invention is to provide a motor vehicle which is able to travel on roads and rails using the engine torque as is usually utilizable on driving road wheels.

A still further object of the present invention is to provide a motor vehicle which when travelling on rails uses railway wheels with the driving torque acting on such railway wheels being directly derived from the tired driving road wheels.

According to the invention, in cooperation with the driving wheels, there is provided at least one rail wheel appropriately actuated by one or more rollers eventually driven by the same driving road wheels.

Such an assembly consisting of rail wheels, transmission rollers and organs is capable of assuming at least two states, one is a stall without power state and the other is an engaged operative state.

In the stall state, the tired wheels are directly tractive and the vehicle is in a position to travel on roads, the railway wheels being in an idle disengaged position.

In the engaged operative state, the rail wheels are engaged and at least those corresponding to the driving road wheels are put in rotation by the road wheels themselves; in this state the vehicle is suitable for running on rails.

Further according to the invention the driving rail wheels (those driven by the driving road wheels) can be engaged into the operative state by means of the use of one or more jacks or similar means such as for example lifters or other organs and the engagement will be facilitated by a coordinated reverse movement of the vehicle.

The other rail wheels, in this case the front wheels, will be lowered by known means so as to be lower than and lift up the road wheels.

Further according to the invention, the driving rail wheels can be engaged by a single movement or even by a series of movements.

The invention thus defines a motor vehicle which can operate on both roads and rails, characterised by including in combination:

tired driving road wheels, rail wheels temporarily positionable at least partially below the road wheels; at least some of the rail wheels being driving in such temporary position by the road wheels, and temporary positioning means for rail wheels.

In the following we give a description of the invention by way of non-restrictive example with the aid of the tables in which:

FIG. 1 shows a top plan view of the present invention;

FIG. 2 shows a side elevational view of the invention with the rail wheels shown in a temporarily operative position;

FIG. 3 shows a side elevational view of the invention showing the rear rail wheels in an intermediate temporary position and the front rail wheels in a temporarily disengaged position;

FIG. 4 shows a side elevational view of the invention in which the rear and front rail wheels are in a temporarily disengaged position;

Figure 5:
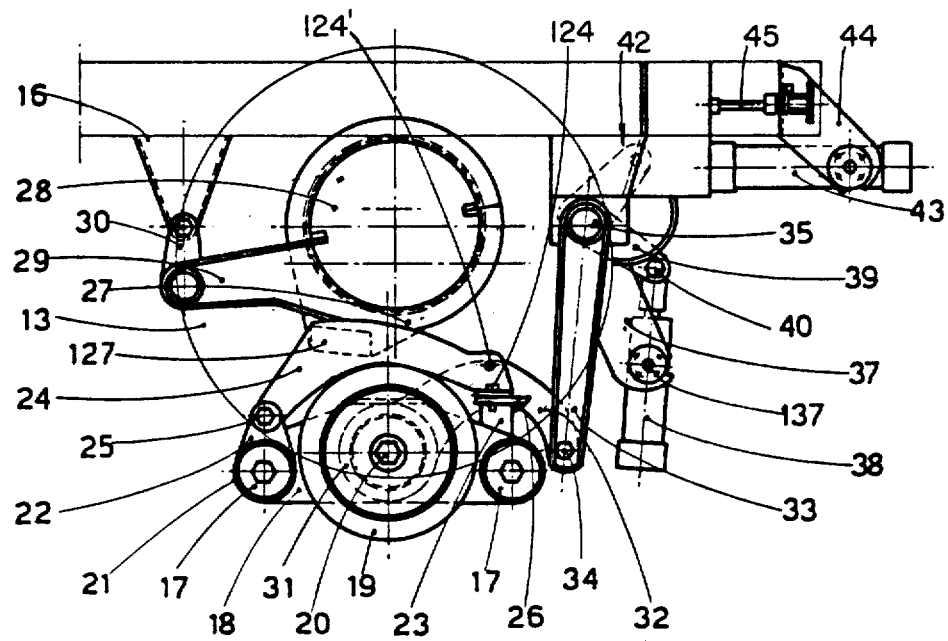
FIG. 5 shows a side elevational view of only the rear rail wheels engaged in a temporarily operative position.
Figure 6:
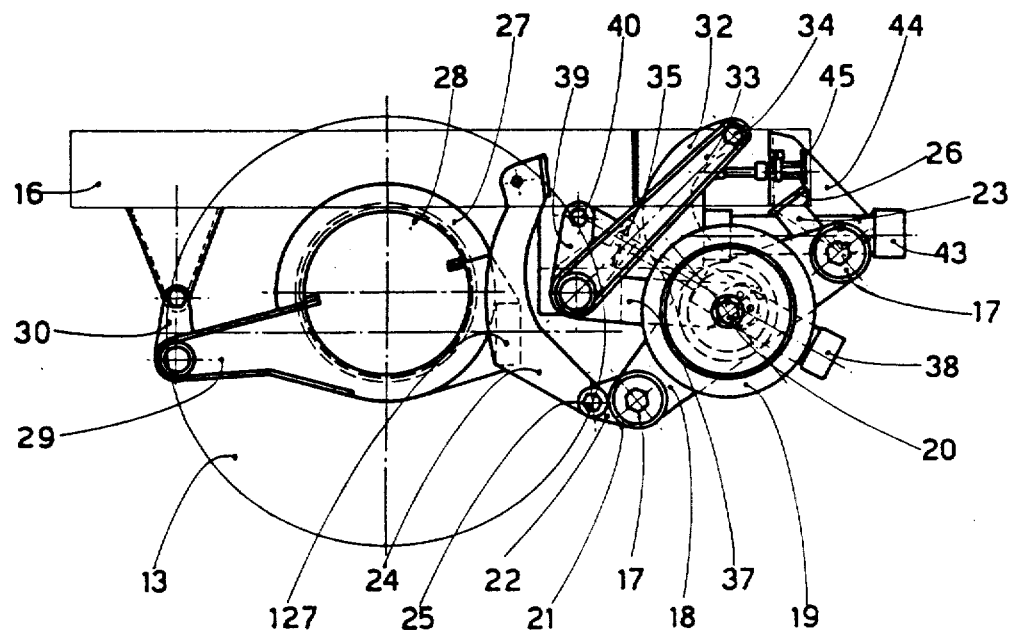
FIG. 6 shows a side elevational view of only the rear rail wheel disengaged in a temporarily withdrawn position.

With reference to the drawings, front rail wheels 10 are lifted and lowered by temporary positioning system 11. Such a system can be operated by an independent hydraulic or mechanical system or other suitable means. Front road wheels 12 are provided with tires and may be advantageously tractive or not and may be directly connected to the steering of the motor vehicle. Tired rear road wheels 13 can have one or both tractive at least about one axle. Transmission means 14 supplies the driving torque to the road wheels 13. Transmission means 14 are conventional transmission organs which transfer the engine torque to the driving road wheels 13 in a known manner. Shock absorber means 15 may be provided on the vehicle and cooperate with the chassis 16. Driving rollers 17 together with the rail wheels 19 may be temporarily positioned. In the operative position the rollers 17 are driven by the road wheels 13 by means of direct contact with the road wheels 13. Such rollers 17 may have any suitable surface that enhances their contact and adhesion and may transmit their rotation to a gear reduction group 18 which in turn transmits the rotation to at least one of the rail wheels 19. By means of shaft 20, the reduction unit 18 can be of a gear, chain or other type and may be, in certain cases, an overgear unit instead of a reduction unit.

Rollers 17, in the part not involved in contacting the road rollers 13, are sustained by two supports 21 provided in the reduction unit 18.

On such support 21 there may be positioned on one side the supports 23 and on the other the connecting rods 22.

The connecting rods 22 are rotatingly pinned at 25 to arms 24 (fifth lever) to form an articulated joint, while the support 23 is terminally provided with a base 26 on which it can rest and on which an end of arm 24 can be fixed when the rail wheels 19 are in a temporarily operative position.

The arms 24 are in their turn fixed in a peripheral position to mobile rings 27 rotatable coaxially about fixed supports 28.

Fixed supports 28 are also anchored, through arm 29 and the connecting rod 30, to the chassis 16 of the vehicle.

A fourth lever 32, shaped in this example, is rotatable and keyed coaxially at 31 on shaft 20.

The other end of the lever 32 is rotatably hinged to third lever 33 by means of pin 34.

A rotatable pin 35, or the shaft, of the lever 32, to which lever it is integral, coaxially slides within the sleeve 36.

The shaft 35 is, positioned normal to the centerline of the motor vehicle, substantially parallel to the axle 20 of the rail wheels 19 and sustained by the chassis 16 of the vehicle through special means.

Integral to the sleeve 36, there is provided an anchored support 37, which rotatably sustains at 137 the first jack 38 which is connected to the first lever 39 by means of pin 40.

Jack 38, is intended in the example for the temporary positioning of the unit connected to the rail wheels 19, during the transmission of the unit from the operative position to the disengaged position and vice versa.

Lever 39 is solidly and radially fixed to the shaft 35 and through the action of the jack 38, is angularly displaced about the axis of the shaft 35 by means of lever 33.

This means that jack 38 can displace the rail wheels unit through levers 39 and 33, which rail wheels unit is nonetheless rotatably anchored to the fixed supports 28 through 18-22-24-27.

In the drawings, the action of the jack 38 is limited by the stroke of the same and to avoid using too long jacks a circumferential groove 41 is provided on sleeve 36.

On sleeve 36, is also fixed a second lever 42 to whose end is anchored the end of the piston rod of second jack 43 disposed in the drawings substantially horizontally.

Such jack 43 can be rotatably anchored to supports 44 which are in their turn fixed to the chassis 16 of the vehicle.

According to the invention, the task of jack 43 is to complete the temporary positioning of the unit connected to the rail wheels 19 acting from the temporary transit position resulting from the action of the jack 38 to the disengaged position allowing thus the motor vehicle to freely operate on the road.

On the actuation of lever 42 by jack 43, the lever 42 transmits the motion to the sleeve 36 which by acting against jack 38 transmits motion to shaft 35 then to the unit of rail wheels through lever 33.

Co-operating with the chassis 16 there are provided clamping means 45 and 145 which provide for locking the rail wheels unit 10 and 19 in the disengaged position.

Clamping means 45 and 145 can act directly (45) or through a lever 245.

Looking now into how the invention works, when the road wheels 12 and 13 are in working position the motor vehicle is suitable to travel on roads like a conventional vehicle; in which case the tired road wheels 12 and 13 are driven by the engine torque through conventional transmission means 14.

The units of front rail wheels 10 and rear rail wheels 19 are advantageously arranged in a raised disengaged position such that the motor vehicle is able to travel on the road.

When the rail wheels 10 and 19 are lowered into the operative temporary position, the motor vehicle becomes operational as a conventional railway transport means.

In this case the driving road wheels 13 transmits their rotatory movement to one or more rollers 17 by means of a frictional engagement of the same.

Rollers 17 transmit such movement in their turn to the speed reduction unit 18 which outputs to the rail wheels 19.

This sequence of transmission can be advantageously but not necessarily done by toothed gears, chains, belts, hydraulic motors or other suitable means.

The reduction unit 18 can provide for transmitting to the rail wheels 19 either a reduced number of rev/min or a multiplied rev/min.

The operational phases which must be executed to convert the vehicle operating as a road vehicle to railway transport means and vice versa, takes place by lifting up the front 10 and rear 19 rail wheels with the possibility of lifting one unit at time as may be necessary.

For lifting up the group connected to rail wheels 19, the clamping means 124 must be unlocked, these means consists in the drawings of a pin provided between the support 23 and the arm 24.

Actuating then jack 38, the lever 39 is moved, which lever anchored to shaft 35 which is in the drawing is obliged now to execute part of the rotation about its own longitudinal axis.

Since lever 33 is also fixed to shaft 35, lever 33 rotates about the axis dragging with it the pin 34 and lever 32.

Lever 32 which is rotatably connected coaxially to shaft 20 of the rail wheels 19 by means of support 31, drags with itself both wheels 19 and the reduction unit 18 connected thereto as well as rollers 17.

The arm 24, rigidly connected to the mobile ring 27 at 127, turns about the axis of this ring detaching itself from support 23 while remaining rotatably anchored to the group of rail wheels 19 through the connecting road 22 to which it is pinned at 25.

As seen in the drawings the action of the jack 38 ceases when it substantially arrives at the end of its stroke.

In order to avoid the use of too long jacks the invention envisages the use of a second jack 43.

Jack 43 acts on lever 42 disposed radially and solidly on the circumference of sleeve 36.

When the jack 43 acts on sleeve 36, the latter acts on lever 39, through groove 41, and turns upward both the jack 38 and lever 33 as well as the entire group connected to lever 33 and to the rail wheels 19.

This is because the sleeve 36 acts on lever 39 and thus on shaft 35.

Further turning of shaft 35 permits lever 33 and the unit connected to the rail wheels 19 to continue with the lifting action to the desired point.

In the drawings, the movement is achieved by jacks 38 and 39 but can also be executed by hoists, wires, lift rods, levers, hydraulic motors, lifters or similar means, these forming the functional but strictly essential part of the embodiment according to the invention.

At this point the unit connected to the rail wheels 19 can be locked by clamping means 45 which can advantageously engage either special seatings provided on the shaft 35, the support 26 or other suitable part.

Such clamping action, indispensible for the proper working of the vehicle on the road, can also be provided on the other parts of the unit connected to rail wheels 19 and can be put into action by any suitable means.

The front wheels 10 of the motor vehicle are temporary positioned by jack 111 which acts on the turnable support 11 and are advantageously brought from the disengaged position (FIGS. 3 and 4) to the engaged one (FIG. 2) and vice versa by means of jack 111.

This system of a substantially known type can be advantageously actuated by the same hydraulic plant which acts on the rear rail wheels 19 and can be actuated by means of levers, wire ropes, lifter or others.

To convert the motor vehicle operating as a road vehicle into a rail car, firstly but not necessarily, the rail wheels 10 are lowered into the operational position by unlocking means 145 which stays in a disengaged position.

Then by means of the hydraulic jack 111 the positioning of the rail wheels into the operational configuration is executed.

This operation is executed when the motor vehicle is longitudinally positioned on top of the rails which must have the same width as the length of axle of the vehicle rail wheels.

In the operational position of rail wheels 10 and 19 said wheels are at a lower position than the road wheels 12 and 13 so that the rail vehicle can run on the railway without problems.

In order to bring the unit of rail wheels 19 from the disengaged position to the operational one, firstly the clamping means 45 are unlocked and then the jack 43 is actuated to partial turn shaft 35 and lever 33 connected thereto, the rotation being in the opposite direction to the rotation that takes place during lifting operation of the rail wheels 19.

Such rotation also results in a partial lowering of the unit connected to the rail wheels 19 to an intermediate position.

At this point jack 38 is activated which causes a further lowering of the rail wheels 19 and the group connected thereto.

According to the invention, such a lowering advantageously but not essentially continues until the rail wheels 19 are positioned on the rails underneath thereto and practically until front rollers 17 come into contact with the tires of the road wheels 13.

At this point, by a co-ordinated reverse movement of the motor vehicle, the rail wheels 19 are brought to the operational position.

The operational position is limited by the abutment of one end of the arm 24 on base 26 of support 23.

There are also provided clamping means 124 for locking the unit of rail wheels 19 in this position, such clamping means 124 can advantageously by arranged between the drum 24 and lever 32.

It is to be noted that the axle of the driving rail wheels 19 in the operational position is substantially arranged to stay between the axle of the road wheels and the ground and lie in the neighbourhood of the vertical plane that substantially contains the axle of the road wheels.

We have here described one preferential form of the invention but there can be other embodiments and improvements falling within the ambit of the inventive idea.

It is thus possible to change forms and dimensions and it is possible to provide the rail wheels 10, 19 with a different length of axle. It is possible to replace the hydraulic jacks 38 and 43 with other suitable means such as a cam lifter. It is possible to provide a system for lifting the front rail wheels 10 which is different and/or similar to that of the rear wheels 19. It is possible to provide different transmission means for the engine torque. It is also possible to provide different clamping and anchorage means and in different parts. It is possible to envisage the absence of the reduction unit 18, or a different reduction unit. It is possible to arrange for one or more rollers 17 to receive motion from the road wheels. It is possible that rollers 17 receive their rotation from one or more driving road wheels 13. It is possible to envisage the presence of one or more rollers 17 on one side of the vehicle only. It is further possible to provide a system for lowering and lifting the rail wheels in one movement only or with a succession of movements and so on. These and other alternative embodiments are all possible for a person skilled in the art without going beyond the ambit of the inventive concept.

I claim:

1. Motor vehicle for use on roads and railways comprising: driving tired road wheels; rail wheels temporarily positionable at least partially below the said road wheels, at least some of said rail wheels being driven in this temporary position by said road wheels; temporary positioning means provided for the said rail wheels; said positioning means consist of two jacks the first jack being for putting the driven rail wheels into the temporary working position and for the temporary transitory displacement of the said driven rail wheels, and the second jack being for putting the same unit of the driven wheels and first jack into the temporary disengaged position; a first lever; an axle integral with said first lever; a sleeve external to said axle and sustaining means anchored to said external sleeve, said first jack acting on said lever and being sustained by said means.

2. Motor vehicle for use on roads and railways comprising: driving tired road wheels; rail wheels temporarily positionable at least partially below the said road wheels, at least some of said rail wheels being driven in this temporary position by said road wheels; temporary positioning means provided for the said rail wheels; said positioning means consist of two jacks the first jack being for putting the driven rail wheels into the temporary working position and for the temporary transitory displacement of the said driven rail wheels, and the second jack being for putting the same unit of the driven wheels and first jack into the temporary disengaged position; a first lever; an external sleeve; a second lever integral to said external sleeve; said second jack acting on said second lever, said external sleeve defining a slot in which passes said first lever actuated by said first jack, the stroke of said first lever within said slot being limited.

3. Motor vehicle for use on roads and railways comprising: driving tired road wheels; rail wheels temporarily positionable at least partially below the said road wheels, at least some of the rail wheels being driven in this temporary position by said road wheels; temporary positioning means provided for the said rail wheels; said positioning means consist of two jacks the first jack being for putting the driven rail wheels into the temporary working position and for the temporary transitory displacement of the said driven railwheels, and the second jack being for putting the same unit of the driven wheels and first jack into the temporary disengaged position; a first lever; an axle integral with said first lever; a sleeve external to said axle; sustaining means anchored to said external sleeve, said first jack acting on said lever and being sustained by said means; and third and fourth levers wherein said axle carrying the external sleeve is integral to at least said third lever connected to said fourth lever which is rotatably connected to the unit of driven rail wheels.

4. Motor vehicle for use on roads and railways comprising: driving tired road wheels; rail wheels temporarily positionable at least partially below the said road wheels, at least some of said rail wheels being driven in this temporary position by said road wheels; temporary positioning means provided for the said rail wheels; a connecting rod rotatably connected at one end to said driven rail wheels; a fifth lever connected to the other end of said connecting rod; a support plane for said fifth lever; and anchorage means to which said fifth lever is rotatably attached.

* * * * *